Feb. 21, 1967  J. SHAHEEN  3,305,724
MONITORING SYSTEM FOR TAXI METERS
Filed Sept. 9, 1963
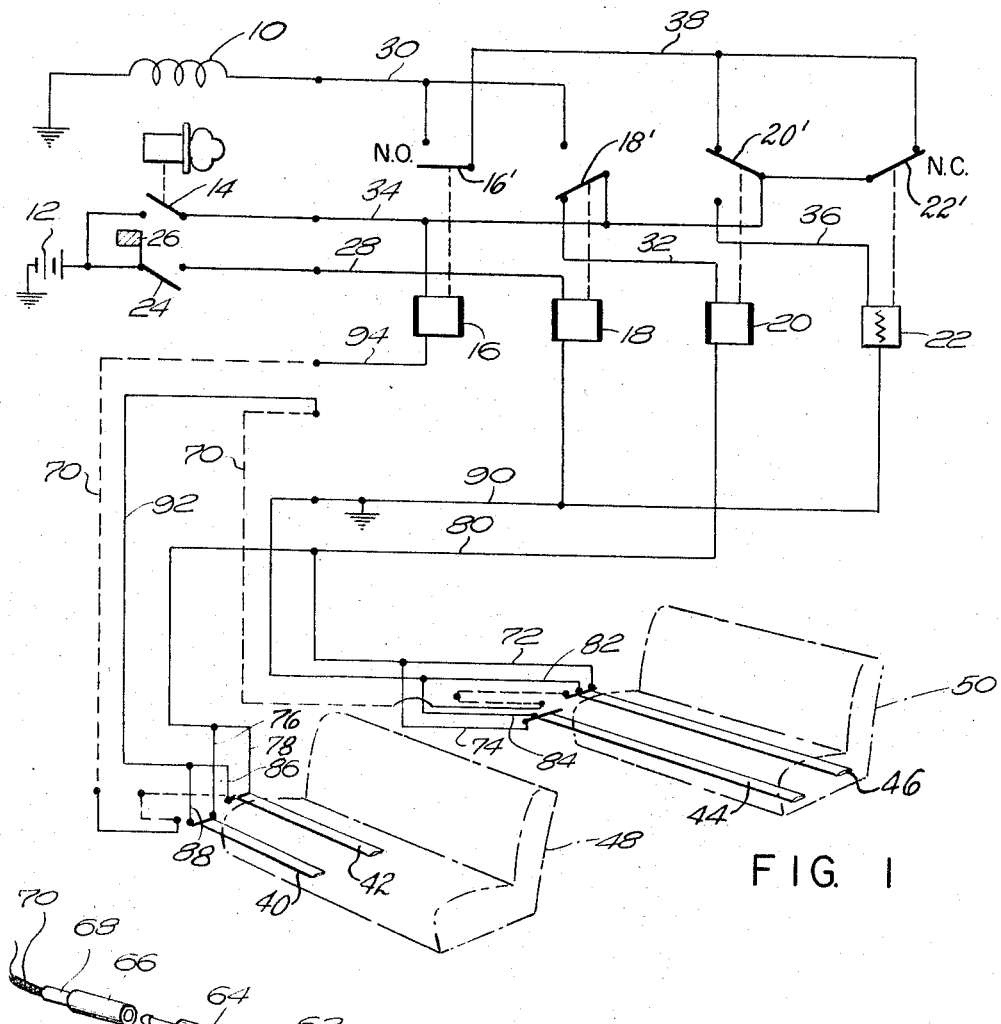
FIG. 1
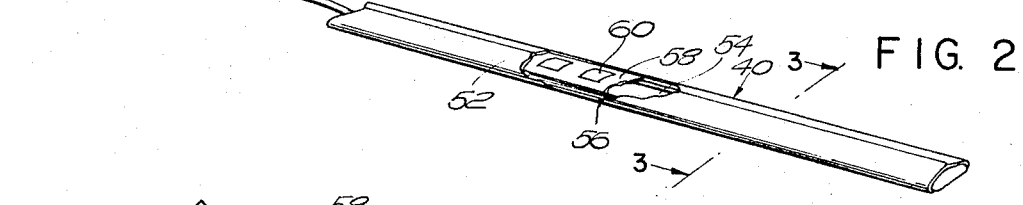
FIG. 2
FIG. 3
INVENTOR.
JOHN SHAHEEN
BY Morse & Altman
ATTORNEYS

United States Patent Office

3,305,724
Patented Feb. 21, 1967

3,305,724
MONITORING SYSTEM FOR TAXI METERS
John Shaheen, 119 Farquhar St.,
Roslindale, Mass. 02131
Filed Sept. 9, 1963, Ser. No. 307,530
5 Claims. (Cl. 307—10)

This invention relates generally to monitoring systems and more particularly is directed towards a new and improved system for monitoring fare meters in taxi cabs to prevent the improper use of cabs by drivers.

Taxi fleet operators have found that from time to time a few dishonest driver-employees will try to cheat the cab company of collected fares. Such dishonest drivers are able to pocket a fare by not turning down the meter arm to start the meter when a passenger enters the cab but instead will collect a flat fee from the passengers at the end of the trip. As another technique, the driver may not start the meter running until a substantial portion of the trip is completed. The driver collects a fare that is not the amount that would normally be payable for the trip but only what appears on the meter plus an extra profit for himself. This practice requires a collaboration with the passengers who save money but cheats the taxi company of its usual charges.

Numerous monitoring systems have been developed for the purpose of guarding against the elicit operation of taxi cabs by dishonest drivers, but none of these systems have been entirely satisfactory. Prior systems have been found to be subject to tampering by dishonest drivers so as to render them ineffective. Other systems have been excessively complicated and prohibitively expensive to install.

Accordingly, it is an object of the present invention to provide improvements in systems for monitoring fare meters in taxi cabs.

Another object of this invention is to provide a taxi-meter monitoring system which is positive acting, completely reliable, low in cost and simple to install.

A further object of this invention is to provide a taxi-meter monitoring system that is completely tamper proof.

More particularly, this invention features a monitoring system for taxi meters comprising one or more pressure responsive flexible strip switches preferably located in the cab seats and adapted to control a relay system to de-energize the cab ignition system if the meter flag is not turned down when passengers are taken aboard. As a feature of this invention, a thermal time-delay switch is employed in the relay system in order to provide the driver with a nominal period of perhaps 30 seconds or so within which he must start his meter running in order to prevent his cab from becoming inoperative.

As another feature of this invention, low-cost, rugged and efficient flexible strip switches are employed within the cab seats in order to sense the weight of a passenger sitting on the seat. The strip switches are connected to the relay system by means of cables with conductive shields which form part of the relay system. Any attempt to cut through the cables in order to render the system inoperative will result in the taxi cab becoming inoperative.

But these and other features of the invention, along with further objects and advantages thereof, will become more fully apparent from the following detailed description of a preferred embodiment of the invention with reference being made to the accompanying drawings, in which:

FIG. 1 is a schematic diagram of a monitoring system made according to the invention, FIG. 2 is a view in perspective of a strip switch employed in the invention, and FIG. 3 is a cross-sectional view taken along the line 3—3 of FIG. 2.

Referring now to the drawings and in particular to FIG. 1, the reference character 10 indicates a coil in a taxi cab ignition system. The coil 10 is adapted to be energized by a battery 12 through an ignition switch and a monitoring system which includes three relays 16, 18 and 20 with associated switches 16', 18' and 20' and a thermal time-delay device 22 with associated switch 22'. A switch 24, controlled by a flag 26 on the taxi fare meter, is connected in parallel to the ignition switch 14 and is also connected to the coil for the relay 18 through a lead 28. A lead 30, protected by a BX sleeving, which is grounded, connects the coil 10 to one contact of the relay switch 16' and to one contact of the relay switch 18' which has two operating positions. A lead 32 connects the opposite contact of the relay switch 18' to the coil for the relay 20. A lead 34 connects the ignition switch 14 to the coil for the relay 16, to the switch arms of the relay switches 18' and 20' and to the switch arm of the thermal delay switch 22'. A lead 36 connects the resistance element of the thermal delay device 22 to one contact of the relay switch 20'. This switch 20', it will be seen, is a two-position switch with the opposite contact being connected to a lead 38 which also connects with a contact for the thermal-delay switch 22' and to the switch arm for the relay switch 16'.

The relay system is operatively connected to a number of flexible strip switches 40, 42, 44 and 46 all of substantially the same construction with the switches 40 and 42 being mounted under the right-hand side of the front seat cushion 48 and the switches 44 and 46 mounted under the entire width of the rear seat cushion 50.

As shown in FIGS. 2 and 3, each flexible strip switch comprises a flexible tubular outer jacket 52 of vinyl plastic, rubber or other suitable material characterized by resiliency and flexibility. Extending lengthwise within the jacket 52 is a conductive strip 54 of copper or the like with insulating strips 56. Extending along the opposing marginal edges of the conductive strip 54 is a second conductive strip 58 which is laterally curved and normally maintained out of contact with the strip 54 by means of the insulating strips 56. The curved strip 58 typically is formed with spaced open sectors 60 to improve flexibility of the strip.

In practice, a circuit is completed when pressure is applied to either side of the strip switch 40 so as to collapse the strip 58 down against the strip 54. When a strip switch 40 is mounted beneath the taxi seat cushion, the weight of a passenger will be sufficient to close one of the conductive strip elements against the other to complete a circuit to be described herein.

The free end of the strip switch 40 is sealed and to the opposite end thereto is connected a cable 62 covered by a suitable insulating ply such as vinyl or the like and having a male plug connection 64 for insertion in a female plug connection 66 attached to a cable 68. In practice, the jack plug connection shown in the drawings may be employed or a more solid three prong type connector may be utilized. For obvious reasons, it is desirable that the connection be extremely rugged and durable to prevent unauthorized tampering. Such a connection may be achieved by a plug completely encapsulated in an epoxy resin or by a metal housing encasing the connecting unit.

In any event, it will be noted that the cables 62 and 68 are provided with metallic shielding 70 which form a part of the relay control circuit. As best shown in FIG.

1, each of the strip switches 40, 42, 44 and 46 is provided with leads 72, 74, 76 and 78 connected at a common junction to a lead 80 for the coil of the relay 20. Each of these strip switches is also provided with leads 82, 84, 86 and 88 with the leads 82 and 84 joined to one another and to a lead 90 connected to the coil for the relay 18 and to the thermal delay device 42. The leads 86 and 88 also connect to one another and by a common lead 92 connect to the shielding 70, to the lead 82 and thereby to the lead 90. The coil for the relay 16 will be seen to be connected to the shielding 70 by a lead 94.

In FIG. 1 the monitoring system is shown in an idle condition with the ignition switch 14 in an open position and with no passengers in the cab. When the driver turns on the ignition 14, the coil 10 will be energized through a circuit formed by the lead 34, through the switches 20′ and 22′, through lead 38, through switch 16′ and thence through the lead 30 to the coil 10. It will be understood that when the ignition 14 is closed, the relay 16 will be energized so as to close the contacts of this normally open relay. The circuit for the relay 16 includes the lead 34, the lead 94 and the shielding 70.

Assuming now that one or more passengers are seated in the front or back seat or both, one or more of the strip switches 40 will be closed to complete a circuit to the relay 20 and to the thermal time-delay switch 22. The circuit may be traced from the battery 12 through the switch 14, the lead 34, the switch 18′, the lead 32, the coil for the relay 20, the lead 80, the lead 72, the switch 46, for example, the lead 82, the lead 90, the time delay device 22, the lead 36, the switch 20′ (which is biased against the contact for the lead 36 by the energization of the relay 20), through the normally closed switch 22′, the lead 38, the now closed switch 16′, the lead 30 and through the coil 10 to ground. When the relay 20 is energized its switch arm will bias against the contact to the lead 36 to complete the circuit to the thermal delay device 22. The thermal device typically has a delay of perhaps 20 or 25 seconds, as desired, to provide the driver adequate time in which to turn down his meter flag 26 and thereby start his fare meter running. It will be appreciated that in this condition the thermal delay and its switch 22′ are maintaining the circuit to the ignition coil 10. This temporary holding circuit may be traced from the battery 12 through the switch 14, the lead 34, the switch 22′, the lead 38, the now closed switch 16′, the lead 30 and through the coil 10 to ground. If the driver fails to turn down his flag 26 to close the switch 24, the thermal delay device 22 will time out and move its switch 22′ into an open position and thereby de-energize the ignition coil 10 and thus stop the taxi. When the driver turns down his flag 26 to close the switch 24, the relay 18 will be energized and its switch arm will move against the contacts to the lead 30 to thereby restore power to the ignition coil 10.

Tampering of the system is made impossible by the fact that the relay 16 is energized through the braided shielding 70. It will be understood that should an unscrupulous driver cut through the shielding in an attempt to alter the wiring, the relay 16 would immediately become de-energized and thereby opening its contacts to cut off power to the ignition coil 10.

It will be appreciated that the system is completely effective for the purpose intended since it permits the drive to cruise freely in search of passengers without interruption. However, once a passenger is taken aboard whether in the front or back seat, the driver is obliged to start his meter running before the delay switch 22 de-energizes the ignition coil. Should the driver intentionally or inadvertently fail to turn his meter flag down, his cab will immediately come to a halt. However, the motor may be immediately restarted by merely turning down the meter flag to close the switch 24. Thus the cab company is assured that a full fare will be recorded on the meter. By employing a pair of strip switches for each seat, locating one to the rear, one towards the front of the seat, at least one of the strip switches will be actuated by the passenger upon seating himself. In practice the strip switches for the front seat will extend only across the passenger side of the seat and not under the driver's side for obvious reasons.

While the invention has been described with particular reference to the illustrated embodiment, it will be understood that numerous modifications thereto will appear to those skilled in the art. For example a thermistor may be employed in place of the thermal delay device 22. In such a modification the thermistor element would be located in the lead 80 for the relay 20 and the thermal delay switch 22 may be eliminated entirely, along with its associated circuitry. The thermistor would have the effect of delaying the energization of the coil for the relay 20 to provide the desired delay period for the driver to start his fare meter running. In cabs provided with folding jump seats it is usually not practical to employ the strip switches. For such installations a mercury switch may be employed in place of the strip switch, attached to any convenient folding portion of the jump seat. Obviously, the mercury switch will be open when the seat is folded down and closed when set up. Other modifications will appear to those skilled in the art.

It will be understood that the above description and accompanying drawings should be taken as illustrative of the invention and not in a limiting sense.

Having thus described the invention, what I claim and desire to obtain by Letters Patent of the United States is:

1. In combination with a taxi cab equipped with a fare recording meter having an operative and an inoperative position, a battery, an ignition system, an ignition switch and passenger seats, a system for monitoring said meter, said system including at least one normally open sensing switch mounted to each passenger seat and adapted to be closed by a passenger sitting in said seat, a set of first, second and third relays operatively connected to said sensing switches, to said meter, to said ignition switch and to said ignition system, a cable having a conductive shield connecting said sensing switches to said relays, the coil for said first relay being connected to said ignition switch and adapted to complete a first circuit to said ignition system through the switch for said first relay in series with the switch for said third relay when said ignition switch is closed, said first relay being connected to said shielding whereby rupture of said shielding will de-energize said first relay and thereby de-energize said ignition system, the coil for said second relay being connected to said meter and having a switch normally completing a circuit to the coil for said third relay in one position, said second relay switch in another position completing a second circuit to said ignition system when the second relay coil is energized by said meter being set in an operative position, the switch for said third relay normally completing a circuit to said ignition system in one position, said sensing switches upon closure being adapted to energize said third relay coil to thereby open said first circuit.

2. A monitoring system according to claim 1 including a time delay cutout switch actuated by closing of said sensing switch and adapted to open said second circuit at the end of a predetermined period.

3. A monitoring system according to claim 1; wherein said sensing switches are elongated flexible strip switches extending lengthwise of said seat and adapted to be closed by one or more passengers sitting thereon.

4. In combination with a taxi cab equipped with a fare recording meter having an operative and an inoperative position, a battery, an ignition system, an ignition switch and passenger seats, a system for monitoring said meter, said system including at least one normally open flexible resilient strip switch mounted under each passenger seat and adapted to be closed by the weight of a passenger sitting in said seat, a set of three relays and a time delay switch operatively connected to said strip switches, to said meter, to said ignition switch and to said ignition system, a cable having a conductive shield connecting said strip switches to said relays and to said delay switch, one of said relays having a normally open switch which when closed constitutes a portion of one circuit to said ignition system, the coil for said one relay being connected to said ignition switch and to said shield whereby rupture of said shield will de-energize said one relay and thereby de-energize said ignition system, the coil for the second relay being connected to said meter and said meter normally completing a circuit to the coil of the third relay in one position, said second relay in another position completing another circuit to said ignition system when energized by said meter being set in operative position, said third relay normally constituting another portion of said one circuit to said ignition system in one position and in another position completing a circuit to said delay switch, sad delay swtch normally completing a parallel portion of said one circuit to said ignition system, said strip switches upon closure being adapted to energize said third relay and open a parallel portion of said one circuit whereby said ignition system may be energized through said time delay switch, said time delay switch being operative to open at the end of a predetermined period whereby said one circuit will be open and said ignition system will be de-energized unless said second relay is actuated by placing said meter in an operative position to complete said other circuit.

5. A monitoring system according to claim 4 wherein said normally open flexible resilient strip switches comprise:
(a) a pair of flexible elongated conductive strips in spaced opposing relation, one of said conductors being transversely arched over the other of said conductors lengthwise thereof;
(b) insulating means mounted between the longitudinal edges of said strips;
(c) a flexible electrically insulating sleeve enclosing said strips, said strips being adapted to be brought into contact by pressure applied to one side thereof at any point therealong.

References Cited by the Examiner
UNITED STATES PATENTS

| | | | |
|---|---|---|---|
| 2,731,100 | 1/1956 | Butler | 307—10 X |
| 2,934,159 | 4/1960 | Butler | 180—82 |
| 3,111,185 | 11/1963 | Butler | 180—82 |
| 3,177,967 | 4/1965 | Wilson | 180—82 |
| 3,193,044 | 7/1965 | Butler | 180—82 |

ORIS L. RADER, *Primary Examiner.*

T. J. MADDEN, *Assistant Examiner.*